United States Patent

[11] 3,610,747

[72] Inventor John Bickel
        Ossining, N.Y.
[21] Appl. No. 754,601
[22] Filed Aug. 22, 1968
[45] Patented Oct. 5, 1971
[73] Assignee Retention Communications Systems, Inc.
        New York, N.Y.

[54] CARTRIDGE-LOADED FILM STRIP PROJECTOR, PARTICULARLY FOR NARROW FILM
    4 Claims, 3 Drawing Figs.
[52] U.S. Cl. .................................................. 353/61, 352/146
[51] Int. Cl. ......................................... G03b 21/16
[50] Field of Search ...................................... 353/55, 57, 60, 58, 61; 352/148, 146, 202; 240/46.01; 350/1

[56] References Cited
UNITED STATES PATENTS

| | | | |
|---|---|---|---|
| 1,302,802 | 5/1919 | Jenkins ....................... | 353/55 |
| 1,620,338 | 3/1927 | Frederick ..................... | 353/55 |
| 2,461,140 | 2/1949 | Capstaff ....................... | 353/55 |
| 2,971,435 | 2/1961 | Singleterry ................... | 353/55 |
| 3,410,498 | 11/1968 | Winkler et al. ............... | 352/72 |
| 1,479,630 | 1/1924 | Sperry ......................... | 352/146 |
| 3,250,175 | 5/1966 | Braun ........................... | 353/61 |
| 3,338,132 | 8/1967 | Ruhle et al. ................... | 353/61 |

FOREIGN PATENTS

| | | | |
|---|---|---|---|
| 190,388 | 6/1957 | Austria ........................ | 353/55 |
| 963,551 | 7/1964 | Great Britain ................ | 353/55 |
| 675,865 | 11/1929 | France ......................... | 352/146 |
| 1,199,664 | 6/1959 | France ......................... | 353/61 |
| 1,097,171 | 1/1961 | Germany ...................... | 353/57 |

Primary Examiner—Harry N. Haroian
Attorney—Robert D. Flynn

ABSTRACT: To provide for cooling of narrow film, for example of the 8 mm. type, while the film is stationary so that it can be used in a film strip projector, a combination of wire mesh and heat resistant optical elements, e.g. glass, in heat transfer relation with cooling baffles are arranged in the light path, and baffles directing a stream of air from a fan or blower past the optical elements and the wire mesh, to provide for attenuation of heat radiant energy in the path of the light.

PATENTED OCT 5 1971
3,610,747
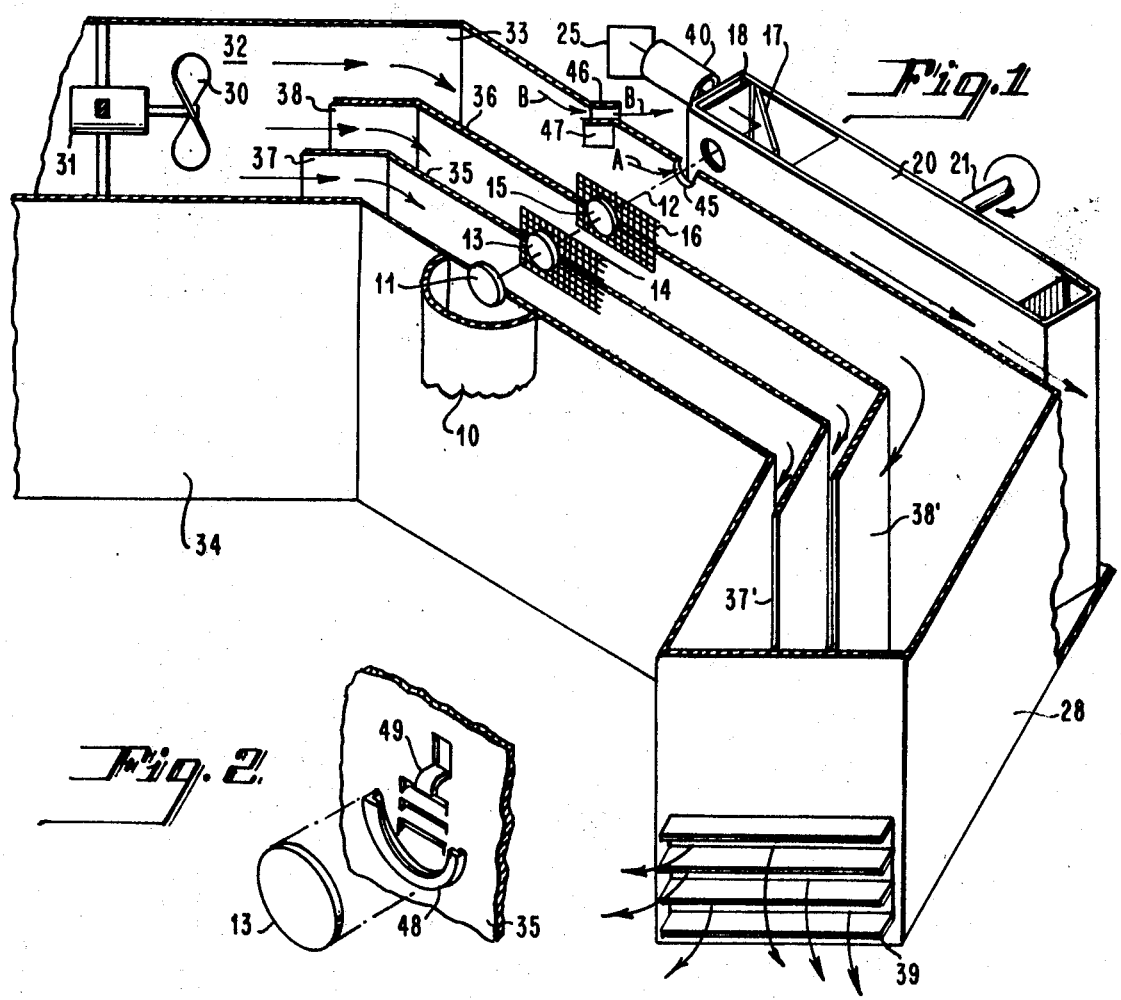
Fig.1
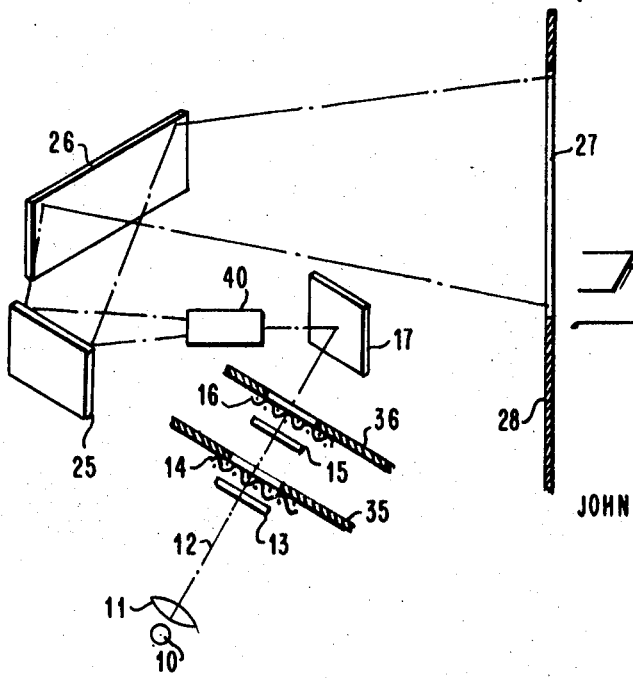
Fig.2
Fig.3
JOHN BICKEL
INVENTOR.

3,610,747

CARTRIDGE-LOADED FILM STRIP PROJECTOR, PARTICULARLY FOR NARROW FILM

The present invention relates to film strip projectors, and more particularly to film strip projectors which can use a "-Super-8," 8 mm. film, as received in cartridges, for slide projection.

Film which is projected is subject to intense light in order to obtain suitable magnification; with very narrow film, such as film of the 8 and 16 mm. size, the intensity of the light source must be high. When continuously running film is projected, each frame is stationary in front of the light source only for a fraction of a second and not long enough in order to be heated by the radiant energy of the light source to such an extent that the emulsion is affected. When, however, film is projected in the form of film strip, that is with each frame stationary for an appreciable period of time, special precautions must be taken to prevent damage to the emulsion due to the intensity of the radiant energy of the light source. This problem becomes particularly acute when a self-contained film strip projector is to be designed in which the light path through the film has to change direction; the film is not readily accessible to direct cooling, while the eventual image, as projected on a ground glass screen, or the like, must have sufficient brightness for viewing in an illuminated room.

It is therefore an object of the present invention to provide a film strip projector in which narrow film, for example of the 8 or 16 mm. type and contained in a cartridge or cassette, can be projected with the individual frames stationary for an indefinite period of time.

SUBJECT MATTER OF THE PRESENT INVENTION

Briefly, in accordance with the present invention, a light source projects a beam of light through an optical system, having one or more optical elements such as heat absorbent glass, in contact with an apertured metal structure such as a wire mesh, to provide for attenuation of the radiant energy of the light source. The optical element or elements and the metal structure (wire mesh) are secured to baffles arranged in a duct, through which air is forced. The path of the optical beam is, therefore, cooled so that air, and dust particles therein, as well as the optical elements therein, will be cooled and external radiation causing additional heating of the film is removed.

In accordance with a feature of the invention, the film is contained in a cartridge, for example of the Super-8 type, which has a lateral window, in which a mirror is placed to provide for right-angle deflection of the beam of light through the film; the duct has an additional window to permit cooling air to escape from the duct and cool the film, as well as the mirror surface to be located within the cartridge.

The structure, organization, and operation of the invention will now be described more specifically with reference to the accompanying drawings, wherein:

FIG. 1 is a top view, in schematic form, of part of the light path and cooling system for the film cassette;

FIG. 2 is an enlarged perspective view of an optical element-cooling arrangement; and FIG. 3 is a side view of the light path, in schematic form, the elements of the apparatus having been omitted for clarity.

In the drawings, which are highly schematic, only the parts essential to the understanding of the present invention have been shown, conventional parts well known in the art having been omitted for clarity. Referring to FIG. 1, a light source 10 which is of high intensity is connected to a suitable source of electric energy, not shown. The output from the light source is collimated, and focused, for example, by a lens element 11, which may be integral with the lamp housing, or part of the lamp glass itself, or separately mounted, in accordance with design requirements. Alternatively, integral or separate reflectors may be used. The path of light from source 10 is indicated by chain dotted line 12. After emerging from lens 11, the beam of light passes through a highly heat-conductive metal element, such as aluminum wire mesh 14, in contact with heat-absorbing glass 13. Wire mesh 14 may lay flat against the glass, be adhered thereto, terminate coextensive therewith or project therefrom, as desired.

Additional, substantially similar heat-absorbing glass-mesh combinations 15, 16, may be used, the number depending upon the heat to be absorbed in relation to the light loss that can be tolerated.

The beam of light 12 then strikes a mirror 17, inclined at 45°, from which the light, after deflection, passes through the film 18, contained within a cartridge 20, which may be of commercial manufacture. Cartridge 20 is located in the apparatus in well-known manner. Film is advanced by engagement with a drive shaft 21, which is rotated in accordance with the desire of the user as schematically shown by the rotating arrow, by claws, or other mechanisms known in the art.

The light, after having passed through film 18 then impinges on a mirror 25, inclined at 45° with respect to the horizontal, as seen in FIG. 3. The light is again reflected by another mirror 26, to be projected back in the direction of the cartridge and impinge on a screen 27, which may in form of a ground glass or matte surface set into a housing wall 28 of the film strip projector.

Reverting again to FIG. 1, a cooling arrangement is provided to prevent excessive heat from being applied to the small film 18. A fan 30, driven by an electric motor 31 provides forced air circulation in a duct 32 formed between a pair of walls 33, 34. The heat-absorbing glasses 13, 15 are set in windows formed in baffles 35, 36, which have air-directing vanes 37, 38, and 37', 38' arranged at their ends. The air flow, schematically indicated by the arrows in FIG. 1, thus passes by the deflecting vanes and cools the baffles and the heat-absorbing glass as well as the wire mesh placed against the glass. The cooled optical elements in the light path thus essentially prevent transmission of excess heat from light source 10 to film 18. The mirror 17 is likewise cooled by air escaping in the direction of arrow A through a window 45 formed in duct wall 33, through which the light beam 12 also passes from source 10 to mirror 17. An additional window 46, punched out of wall 33 and if desired, formed with an air scoop 47, directs cooling air along arrow B toward the front of the film. The cassette 20 is formed to be open at the sides opposite the mirror, in the drawing above, and below the plane of the paper, and permits escape of air beyond housing wall 28. The housing wall 28, at the exit from vanes 37', 38' is formed with louvers 39 to permit escape of heated air.

By providing a precooling arrangement for the optical element in the light path from light source 10 to film 18, sufficient light of high enough intensity can be applied so that a film even of such narrow width as 8 mm. can be held stationary without damage to the emulsion. A lens barrel 40, schematically indicated only, contains optical projection elements to provide for proper divergence of the image, and magnification within the path of the light as illustrated in FIG. 3. Since, at this stage, the film has already been traversed, no further cooling of such lenses is necessary.

A wire applied against the heat-absorbing glass disks 13, 15, may be of comparatively coarse mesh, and of heat-conducting metal, such as aluminum; if the mesh is too fine, graininess of the image may occur; if the mesh is too coarse, insufficient heat may be conducted from the heat-absorbing glass. Experimentation will quickly show the proper size; ordinary insect screen wire (about 1 to 2 mm. mesh spacing) has been found suitable in one commercial embodiment. Rather than providing a separate screen, the baffles 35, 36 themselves may provide the heat-removing metal structure. A region of the baffle is slotted as shown in FIG. 2 and the heat-absorbing glass 13, 15 adhered thereto or mounted thereagainst by a ring 48, and clip 49, or other suitable means to provide good heat transfer contact between glass and baffle metal.

By locating a mirror behind the film, high intensity light can be projected through the film, without disassembling the film from a cartridge or cassette. There is, however, very little space to fit a mirror behind the film particularly when the film is 8 mm. In order to still provide for adequate cooling, the forced air fan 30, 31, is located in the angle included by the path of light from the source 10 to the mirror 17 and then through film 18 and lens barrel 40, the heated air then being exhausted from the cabinet at any convenient location. This arrangement permits a compact construction and viewing of film contained within the cassette, directly, without respooling of film on separate payout and takeup reels, requiring additional handling and threading. Rather than a forced air fan, a blower, or an exhaust fan may be used. The light source 10 may be located elsewhere from the position shown in FIGS. 1 and 3, the light being directed by mirrors or prisms laterally behind the film upon mirror 17, so that at least a portion of the light path will be at right angles to the axis of lens barrel 40.

The present invention has been illustrated and described in connection with a strip film projector for use with 8 mm. film cassettes, and for direct strip film projection; various modifications and changes can be made within the scope of the inventive concept to accommodate specific uses and design requirements.

I claim:

1. Cartridge-loaded film strip projector for projection of images carried on a narrow film strip comprising
a light source;
a housing enclosing said light source;
an optical system within said housing having optical elements directing a beam of light from the source through the film strip in a predetermined path, onto a viewing surface, said optical path including a mirror deflecting said beam of light received from the source at approximately right angles to then pass through the film;
forced air circulation means and air-directing means in said housing to cool the film exposed to the beam of light, said forced air circulation and directing means including:
an opening formed in said housing and aligned with the path of the beam of light from the source to the mirror and in air communication with said forced air circulation means, said same cartridge having an opening adjacent the mirror and aligned with the path of the beam of light from the source to the mirror,
said opening directing air to the mirror to cool the mirror, said mirror deflecting the air directed thereagainst and directing said air to impinge on one side of the film;
said housing being formed with a second opening in air communication with said forced air circulation means to direct air towards the plane of the other side of the film and into the path of light from the film towards the viewing surface.

2. Projector according to claim 1, in combination with a film cartridge, said cartridge being located adjacent at least one of said duct means, and at right angles to the path of light from said light source to said mirror.

3. Projector according to claim 2 wherein the housing is formed as a baffle having said openings therein permitting forced air to impinge upon said mirror, said mirror deflecting the air towards the side of the film adjacent the mirror;
and means adjacent said second opening to direct forced air flow to impinge on the side of the film remote from said mirror.

4. Projector according to claim 1 in combination with a film cartridge, said film cartridge containing said mirror, said mirror being set at about 45° and located immediately adjacent the film and directing light from said source through said film and air towards said film whereby the path of light from the source to the film plane will be at an approximately right angle and the air will be directed to impinge upon one side of the film;
and said second opening is located within the angle included by the path of light;
and directing vanes are located adjacent said second opening to direct flow of air to impinge on the other side of the film.